May 6, 1924.
H. R. COOL
VIBRATION RECORDER
Filed April 6, 1918
1,493,067
2 Sheets-Sheet 1
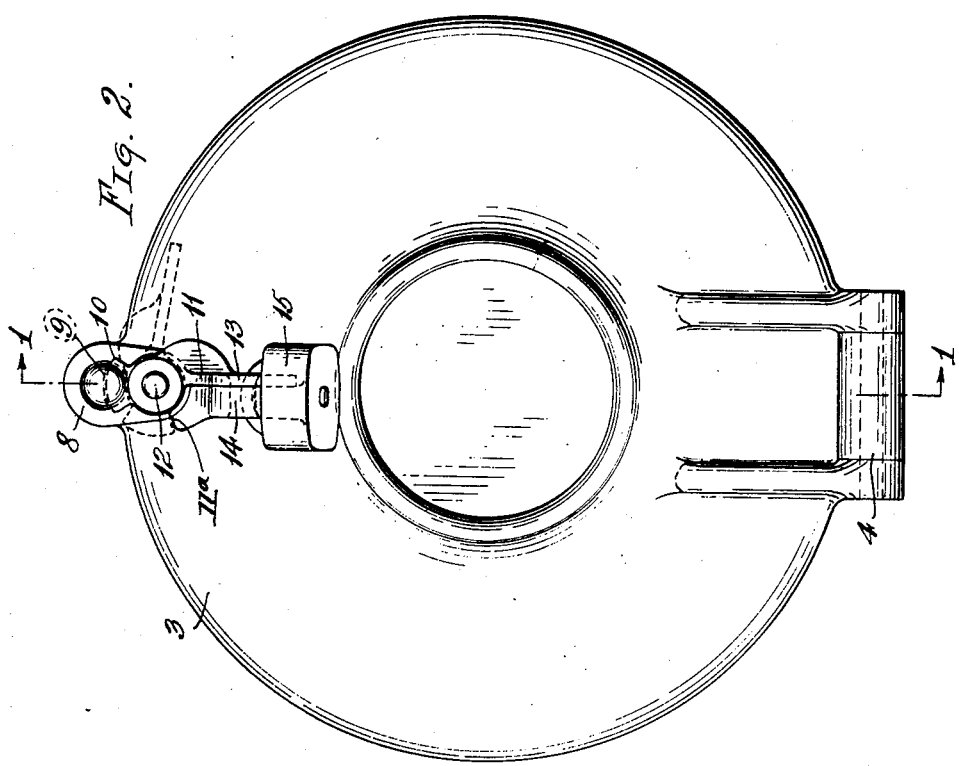
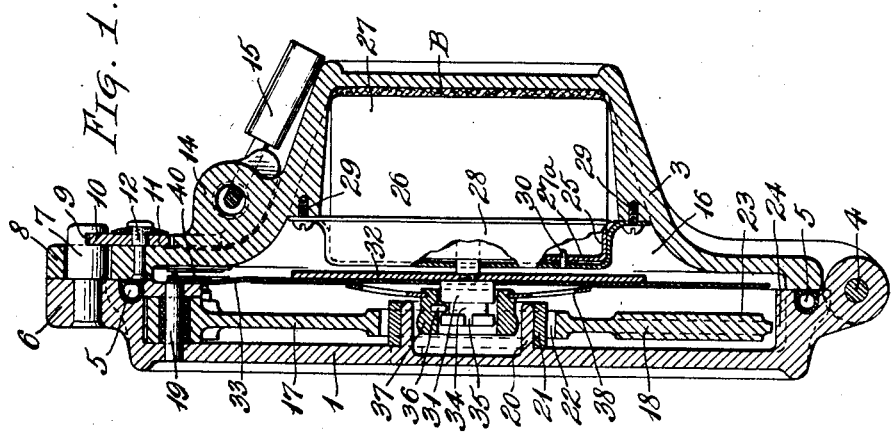
Inventor.
Henry R. Cool
By Brockett and Hyde
Att'ys.

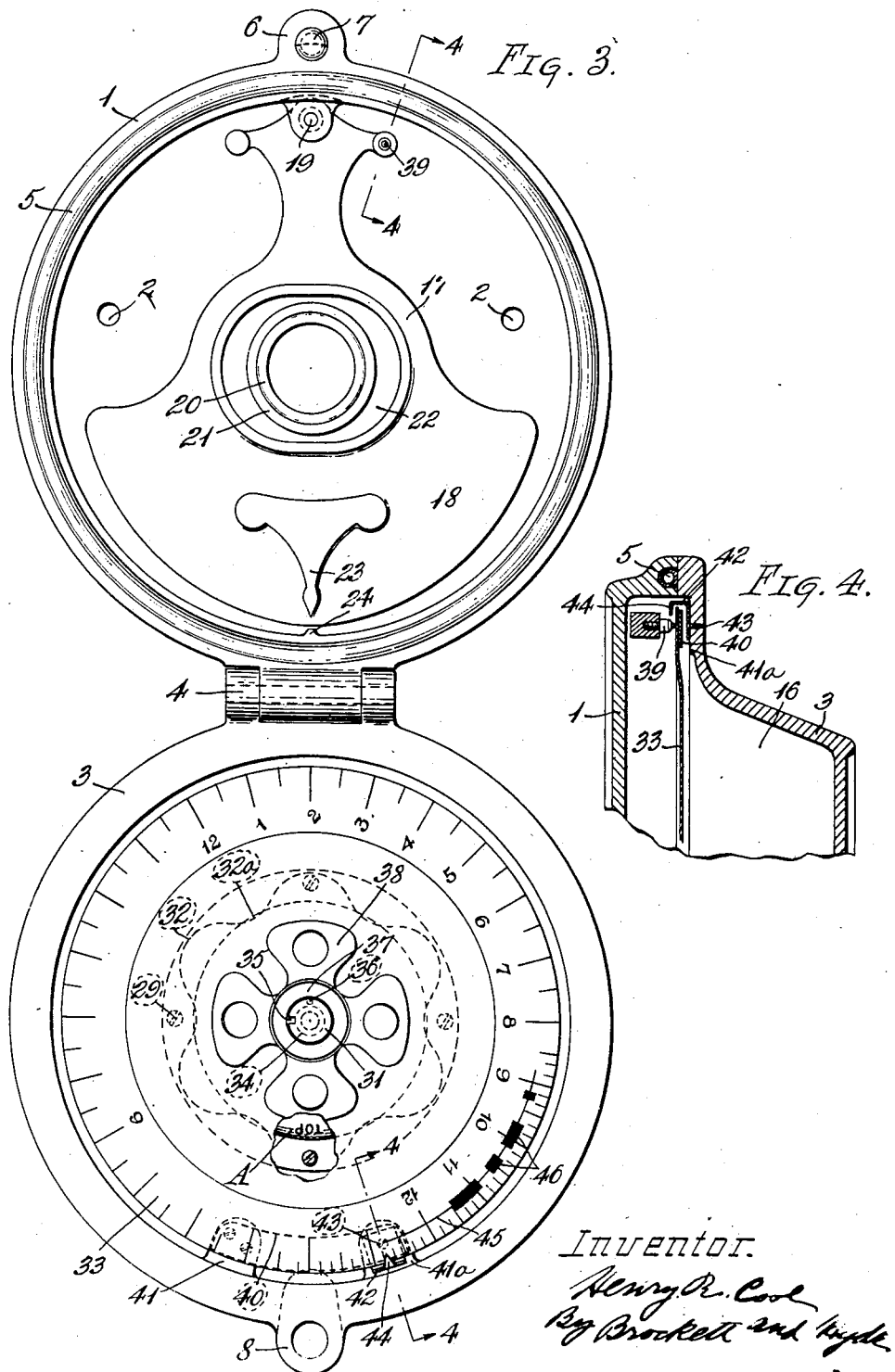

Patented May 6, 1924.

1,493,067

UNITED STATES PATENT OFFICE.

HENRY R. COOL, OF CLEVELAND HEIGHTS, OHIO, ASSIGNOR TO THE SERVICE RECORDER COMPANY, OF CLEVELAND, OHIO, A CORPORATION OF OHIO.

VIBRATION RECORDER.

Application filed April 6, 1918. Serial No. 227,009.

*To all whom it may concern:*

Be it known that I, HENRY R. COOL, citizen of the United States, residing at Cleveland Heights, in the county of Cuyahoga and State of Ohio, have invented certain new and useful Improvements in Vibration Recorders, of which the following is a specification.

This invention relates to vibration recorders, such as are used for recording the movements of motor vehicles, or any mechanism, such as a machine, where vibration is produced and a record can be made thereof.

The object of the invention is to generally simplify and improve the mechanism and provide a recorder of this kind which can be made at low cost; in which the record is produced by simple movements of a minimum number of parts; in which the record is easily removed, replaced or adjusted; in which the clock mechanism is protected against dust and dirt and is required to be replaced in the case in the most efficient position after removal therefrom; and which mechanism is compact, accurate and not liable to get out of order in service.

Further objects of the invention are in part obvious and in part will appear more in detail hereinafter.

In the drawings, which represent one embodiment of the invention, Fig. 1 is a sectional elevation on the line 1—1, Fig. 2; Fig. 2 is a front elevation; Fig. 3 is a front view, showing the front portion of the case dropped down to expose the inner parts; and Fig. 4 is a detail cross section on the line 4—4, Fig. 3.

The recorder shown in the drawings comprises an outer casing or body preferably formed of two parts movably secured to each other to enable the operator to have access to the inner working parts. As shown the casing comprises a rear body portion 1 arranged for attachment to a support, such as by being provided with apertures 2 through which screws can be passed into the support. 3 represents the second half of the casing, which is movably connected to the body in any suitable manner and is shown in the form of a cover connected to the body by a hinge 4 located at the bottom of the recorder so that the cover can be dropped down to the position shown in Fig. 3, thereby exposing the inner mechanism. The body and cover, generally speaking are of circular form, and the two parts together are preferably provided with means for sealing the inner chamber against the entrance of dust, dirt or the like. For this purpose one of the casing members, such as the base 1 is provided with an annular channel or seat to receive a tubular gasket 5, which is compressed by an adjacent portion of the cover when the latter is closed on the body.

Suitable means may also be provided for locking the mechanism closed. For this purpose the body is provided with an ear 6 carrying a pin 7 which extends through an opening in a companion ear 8 on the cover. Pin 7 is provided in its side with a slot 9 to receive a tongue 10 on a latch 11 pivoted on a pin 12 carried by the cover. Said latch has a perforated ear 13 to co-operate with a perforated ear 14 integral or secured to the cover member. When the cover is closed on the body the latch can be turned to the position shown in full lines in Fig. 2, thereby causing the tongue 10 to enter the slot 9. By passing the hasp of a lock 15 through the ears 13 and 14 the cover can therefore be locked closed upon the body to prevent unauthorized persons from opening the recorder, but removal of the lock, enables the latch to be turned to the position shown in dotted lines, Fig. 2, to relieve the tongue 10 from the pin 7, thereby enabling the recorder to be opened. In this position said latch engages a shoulder 11[a] which limits its movement The cover and body together form supporting means for the recording mechanism, all of which is contained within a chamber 16 within the casing. As illustrated the recording member is a pendular body 17 having a weighted lower end 18 and being loosely pivoted upon a pin 19 carried by the casing body. Said body is provided with a central hollow inner hub 20 preferably surrounded by a rubber washer 21, which lies within an elongated opening 22 of the pendular body and serves as a cushion or bumper to absorb the blows of the vibrating pendulum and decrease the noise. 23 indicates a pointer inscribed upon or attached to the pendulum and co-operating with an indicating projection or mark 24 upon the case body. This pointer and indicator mark are utilized in installing the device, which should be attached to its support in a truly vertical position when the support is at rest, said position being indicated by registry of the pointer and its co-operating mark. This arrangement produces equal vibrations of the pendulum toward opposite sides of the casing.

The cover serves as a support for the record and its operating mechanism. 25 represents the casing of a suitable clock mechanism provided with a spindle 26. The particular type or construction of this clock mechanism is not essential, it being understood merely that it is so arranged as to turn the spindle 26 uniformly through one complete revolution in a definite period, say twelve or twenty-four hours. Said clock mechanism, however, preferably has a cylindrical casing 27 pressed into a cup shaped cover 28 whose outer flange is perforated to receive screws 29 threaded into lugs on the recorder casing member 3. Said cover 28 is also provided with one or several pins 30 adapted to enter openings in the end wall 27$^a$ of the clock casing so as to definitely locate the parts of the clock mechanism relative to its cover, the knob formed on the outside of the cup shaped cover aids in opening the same for inspection of the record. As the cover may be provided with an indication at A which is its top it is therefore possible to install the clock with certainty in its most efficient position. Between the bottom of the clock mechanism and the cover 3 is a layer B of felt or other cushioning material. This cushion co-operates with the more or less flexible flange portion of cover 28 to yieldingly suspend the clock mechanism in the outer casing so that it is cushioned against shocks or blows.

The outer end of spindle 26 is threaded to receive a cylindrical member 31 to which is suitably secured a plate 32 forming a support for the central portion of the paper record 33, and whose periphery may be serrated, as at 32$^a$, so that it can be readily turned backward to wind up the clock mechanism. Member 31 has an annular recess 34, communicating with which is a slot 35, said slot and recess co-operating with a pin 36 on a thimble 37 carrying a four-armed yielding clamping plate 38. This construction is of the character of a bayonet joint, and by pushing the thimble 37 over the sleeve 31 and turning the same to the position shown in Fig. 1 and Fig. 3 the paper record is clamped by member 38 against plate 32 and is consequently held and turned uniformly by the clock mechanism. When the casing is closed, as in Fig. 1, the thimble 37 enters an opening in hub 20, this construction making the recorder more compact than heretofore.

39 represents a marking device, which is carried by the pendular body 17 and is located at one side of a vertical line through the pivot 19, as a consequence of which oscillating movement of the pendular body produces practically radial movement of the marking device 39 relative to the center of the recorder and record 33. This marking device lies closely adjacent the rear surface of the record 33 and directly opposite the free end portion of a circumferentially extending light leaf spring 40 attached by a screw to a lug or pad 41 on the cover. On a neighboring pad 41$^a$ of the cover is a small bent metal member 42 adjustably secured for slight turning movement by a screw 43 and having one end portion bent up and over the spring 40 to form an indicating pointer 44. This pointer indicates that portion of the spring which lies directly opposite the marking device 39 when the casing is closed and therefore enables the chart or record to be properly installed or set in place. The record sheet is free from engagement except at its central portion where it is engaged by the clock mechanism and at the point where it is engaged by the backing member and the stylus.

Spring 40 exerts a constant tendency to press the record 33 toward the marking device 39 and therefore serves as a backing for the marking operation. The record may be of ordinary paper in which case the marking device 39 is a pencil or pen, but preferably the record is made of paper of peculiar composition, having a body portion of one color, say dark blue or the like, over which is applied a thin layer of lighter colored material, say grey or white, capable of being easily rubbed off by the marking device. Such paper is well known and can be obtained in the open market. In this case the marking device is merely a hardened point of metal or the like.

In use of the device it is applied to the support in the position best calculated to receive the full effect of vibrations. For example, in applying it to a motor vehicle, the recorder is applied with the axis of the pendulum extending from front to rear of the vehicle so that the pendulum vibrates from side to side. When the pendulum is at rest, even while loading or unloading the vehicle little if any lateral vibration is produced, so that the uniform clock movement turns the record paper past the marking device and produces upon the record a narrow line 45 in the arc of a circle. However, when the vehicle is traveling lateral vibrations or swings are unavoidably produced, as a consequence of which the pendulum 17 swings from side to side and causes short radial movement of the marking device 39 relative to the center of the record, thereby producing upon the record a group or a series 46 of closely adjacent radially extending waves or lines. These groups of waves indicate the periods and times of travel of the vehicle, while the arcuate curves or lines 44 indicate the periods of rest. When applying the device to other forms of mechanism than a motor vehicle it is applied to the mechanism in any suitable position to take advantage of the vibrations of the mechanism for producing motion of the pendulum.

The construction described is simple, forms perfect protection for the clock mechanism, is proof against tampering by unauthorized persons and produces a complete record of the travel of a vehicle during a given period.

What I claim is:

1. A vibration recorder, comprising a casing, a vibrating member supported in said casing for movement in a single plane, a stylus rigidly secured to said vibrating member and thereby held against movement except in a single plane, a record member, means for producing relative traveling motion between the stylus and record member, and means on one side of the record member for establishing and maintaining proper recording engagement of the stylus with the opposite side of the record member.

2. A vibration recorder, comprising a casing, a vibrating member supported in said casing for movement in a single plane, a stylus rigidly secured to said vibrating member and thereby held against movement except in a single plane, a record member, means for producing relative traveling motion between the stylus and record member, and a pressure member engaging one side of the record member for establishing and maintaining proper recording engagement of the stylus with the opposite side of the record member.

3. A vibration recorder, comprising a casing, a vibrating member supported in said casing for movement in a single plane, a stylus rigidly secured to said vibrating member and thereby held against movement except in a single plane, a record member, means for producing relative traveling motion between the stylus and record member, and a spring pressed member engaging one side of the record member for establishing and maintaining proper recording engagement of the stylus with the opposite side of the record member.

4. A vibration recorder, comprising a main casing, record actuating means carried by the main casing, a record sheet carried and operated by said means, a resilient backing member carried by the casing and engaging one side of the record sheet, a cover for said casing, a vibrating member supported in said cover for movement in a single plane, a stylus engaging the opposite side of the record sheet, said stylus being rigidly secured to said vibrating member and thereby held against movement except in the single plane of movement of the vibrating member, and means for holding said cover in place.

5. A vibration recorder, comprising a casing, a vibrating pendulum supported in said casing for movement in a single plane, a stylus rigidly secured to said vibrating pendulum and thereby held against movement except in a single plane, a record member, means for producing relative traveling motion between the stylus and record member, and means on one side of the record member for establishing and maintaining proper recording engagement of the stylus with the opposite side of the record member.

6. A vibration recorder, comprising a main casing, record actuating means carried by the main casing, a record sheet carried and operated by said means, a resilient backing member carried by the casing and engaging one side of the record sheet, a cover for said casing, a vibrating pendulum supported in said cover for movement in a single plane, a stylus engaging the opposite side of the record sheet, said stylus being rigidly secured to said vibrating pendulum and thereby held against movement except in the single plane of movement of the vibrating pendulum, and means for holding said cover in place.

7. A vibration recorder, comprising a casing, record operating means carried by said casing, a record sheet operated by said means, a resilient backing means carried by the casing and engaging one side of the record sheet, and a vibrating stylus supported in said casing for engagement with the opposite side of the record at a point opposite said backing.

8. A vibration recorder, comprising a casing, a vibrating stylus supported in said casing, a record member, means for producing relative traveling motion between the stylus and recorder, and a pressure member movable toward and from the stylus and engaging the opposite side of the record for establishing and maintaining proper recording engagement of the stylus with the record.

9. A vibration recorder, comprising a casing, a vibrating stylus supported in said casing, a record member, means for producing relative traveling motion between the stylus and the recorder, and a pressure member engaging the opposite side of the record for establishing and maintaining proper recording engagement of the stylus with the record, said pressure member having movement only in a direction towards and away from said record member.

10. A vibration recorder, comprising a casing, a vibrating stylus supported in said casing, a record member, means for producing relative traveling motion between the stylus and the record, and a pressure member movable toward and from the stylus and engaging the opposite side of the record for establishing and maintaining proper recording engagement of the stylus with the record, the contacting portion of said pressure member being substantially coextensive with the path traveled by said stylus.

11. A vibration recorder, comprising a casing, a record operating means inclosed in the casing, a record sheet having only its central portion engaged by said operating means for operation thereby, a resilient backing means carried by said casing and engaging one side of said record sheet, a vibrating stylus supported in said casing for engagement with the opposite side of said record at a point opposite said stylus, said record sheet being free from engagement except where engaged by said operating means and by said resilient backing means.

12. In a vibration recorder, a record carrying member, the central portion of said member being formed with a well, a clock mechanism seated within said well, shock absorbing means between said clock mechanism and the bottom of said well, a flexible cover securing said clock mechanism in said well, and means for attaching a record sheet to said clock mechanism for operation thereby.

13. A vibration recorder, including a casing provided with an inner projection, a pendulum therein having an opening freely surrounding said projection, the dimension of said opening in the direction of motion of said pendulum being sufficiently great to allow swinging of the pendulum, and cushioning means between said projection and the walls of said opening.

14. A vibration recorder, comprising a casing including two relatively movable members, a pendulum suspended on one member and carrying a marking device, a clock mechanism carried by the other member, a record support operated thereby, a yielding backing member for the record, and means for indicating when the cover is open that portion of the backing member which lies opposite the marking device when the cover is closed.

15. A vibration recorder, comprising a casing having a hollow inner projection, a pendulum in said casing having an opening to receive said projection, clock mechanism including a rotatable spindle, and means for securing a record thereto, said means including a thimble connected to said spindle and adapted to enter the opening in said projection.

16. A vibration recorder, comprising a casing including two members, one of said members supporting clock mechanism including a spindle, record supporting means carried by said spindle, a marking pendulum carried by the other of said members, and co-operating indicating means on said pendulum and casing.

In testimony whereof I affix my signature.
HENRY R. COOL.